US005590320A

United States Patent [19]
Maxey

[11] Patent Number: 5,590,320
[45] Date of Patent: Dec. 31, 1996

[54] COMPUTER FILE DIRECTORY SYSTEM

[75] Inventor: David Maxey, Andover, Mass.

[73] Assignee: Smart Storage, Inc., Andover, Mass.

[21] Appl. No.: 306,194

[22] Filed: Sep. 14, 1994

[51] Int. Cl.⁶ ..................................... G06F 7/22
[52] U.S. Cl. ..................... 395/619; 395/404; 395/438
[58] Field of Search ...................... 395/600, 700, 395/575, 650, 800, 425

[56] References Cited

U.S. PATENT DOCUMENTS

| | | | |
|---|---|---|---|
| 4,792,937 | 12/1988 | Picard | 369/59 |
| 4,827,462 | 5/1989 | Flannagan et al. | 369/32 |
| 5,008,820 | 4/1991 | Christopher, Jr. et al. | 364/200 |
| 5,029,125 | 7/1991 | Sciupac | 364/900 |
| 5,040,110 | 8/1991 | Miki et al. | 364/200 |
| 5,129,088 | 7/1992 | Auslander et al. | 395/700 |
| 5,233,584 | 8/1930 | Kulakowski et al. | 369/44.27 |
| 5,321,824 | 6/1984 | Burke et al. | 395/400 |
| 5,341,381 | 8/1994 | Fuller | 371/10.1 |
| 5,363,487 | 11/1994 | Willman et al. | 395/275 |
| 5,390,318 | 2/1995 | Ramakrishman et al. | 395/425 |
| 5,392,427 | 2/1995 | Barrett et al. | 395/600 |
| 5,412,668 | 5/1995 | Dewey | 371/39.1 |
| 5,455,926 | 10/1995 | Keele et al. | 395/404 |

*Primary Examiner*—Thomas G. Black
*Assistant Examiner*—C. Pham
*Attorney, Agent, or Firm*—Henry D. Pahl, Jr.

[57] ABSTRACT

The computer system disclosed herein provides an aggregated directory facility which can encompass the file contents of a large number of high capacity storage devices such as CD ROMS and which enables a user to deal those files as though they were in a single physical volume. An age based caching system facilitates access to the most frequently used portions of the aggregated directory.

5 Claims, 7 Drawing Sheets

COMPUTER FILE DIRECTORY SYSTEM

BACKGROUND OF THE INVENTION

The present invention relates to a computer file system and more particularly to such a file system which provides, to a user, an aggregated directory which can encompass the files in a large number of high capacity storage devices such as CD ROMs.

Currently available optical storage devices provide storage capacities which are immense by standards applicable even a few years ago. The most common optical storage media is a so-called CD ROM, this being an acronym for "compact disk read only memory". In fact, however, the optical compact disks are now being implemented using technologies which permit writing to disk e.g., the so-called worm-drive an acronym for "write once, read many". Electro-optical technology has also made possible, in a compact disk format, a media which can be rewritten many times as well as read essentially indefinitely. Increasingly, these storage devices are being used for archiving because of the huge data capacity they afford. Large libraries of data are also being published in the CD ROM format.

Notwithstanding the large data capacities of individual CD ROMs, increasing use is being made of so-called juke-box type CD ROM drives which can hold a multiplicity of individual disks. Still further, in some applications, users are incorporating multiple juke-boxes to handle very large numbers of such disks.

In such systems, the accessing of a particular file, from the myriad number of files or documents which may be available, is an increasingly daunting task. This task is particularly complicated when there may exist, on different disks, multiple versions of the same document which have the same file name. Typically, such files can be differentiated only by time-stamp data which evidences the time of the last edit. As will be understood, this situation occurs frequently in archiving or data backup situations.

While there have existed systems for handling such duplicative file names, these systems have heretofore involved proprietary operating systems and storage formats and have not provided satisfactorily rapid and facile access to the desired information that a user might desire.

Among the several objects of the present invention may be noted the provision of a computer system which will provide an aggregated directory encompassing files located on a plurality storage devices or media; the provision of such a system which facilitates the addition and/or changing of disks or volumes; the provision of such a system which provides rapid access to directory information; the provision of such a system which is highly reliable and which is of relatively simple and inexpensive construction. Other objects and features will be in part apparent and in part pointed out hereinafter.

SUMMARY OF THE INVENTION

The system of the present invention employs a path table which provides, for each directory extant, a logical access path together with a pointer identifying at least one physical volume location where the directory exists. The system generates, from a plurality of physical data volumes, respective volume directory tables containing file names and respective media locations where the respective file data may be read. The volume directory tables also include a pointer identifying any next predecessor file with the same name if extant in the plurality of physical data volumes and also a pointer identifying any next superseding file with the same name if extant in the physical data volumes. Accordingly, the listing may be updated when an available physical volume is changed by updating the respective volume directory table and the related pointers in other volume directory tables, without accessing all physical volume directories.

In accordance with another aspect of the invention, the directory information is cached to provide rapid access to frequently used directory data. A cache address list or table is accessed by hashing disk location information to obtain a corresponding entry into the list. Means are provided for determining if an entry into the list corresponds to a given or requested disk location. If an entry corresponds to the given location, directory data is read from a corresponding random access memory cache location and an age data field is updated. If an entry does not correspond to the given disk location, an iterative means operates to read from the list at the position spaced from the last read position by a predetermined number of entries along the list. The iterative means operates to maintain a record identifying which, of the successive positions read, held the least recently accessed directory data, together with the corresponding age data. After a predetermined number of reads from the list without a match, a reading of the requested directory data from rotating disk memory is initiated. A corresponding block of the thus read directory information is then stored in the cache memory location identified by the least recently accessed list position in the successive tries.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
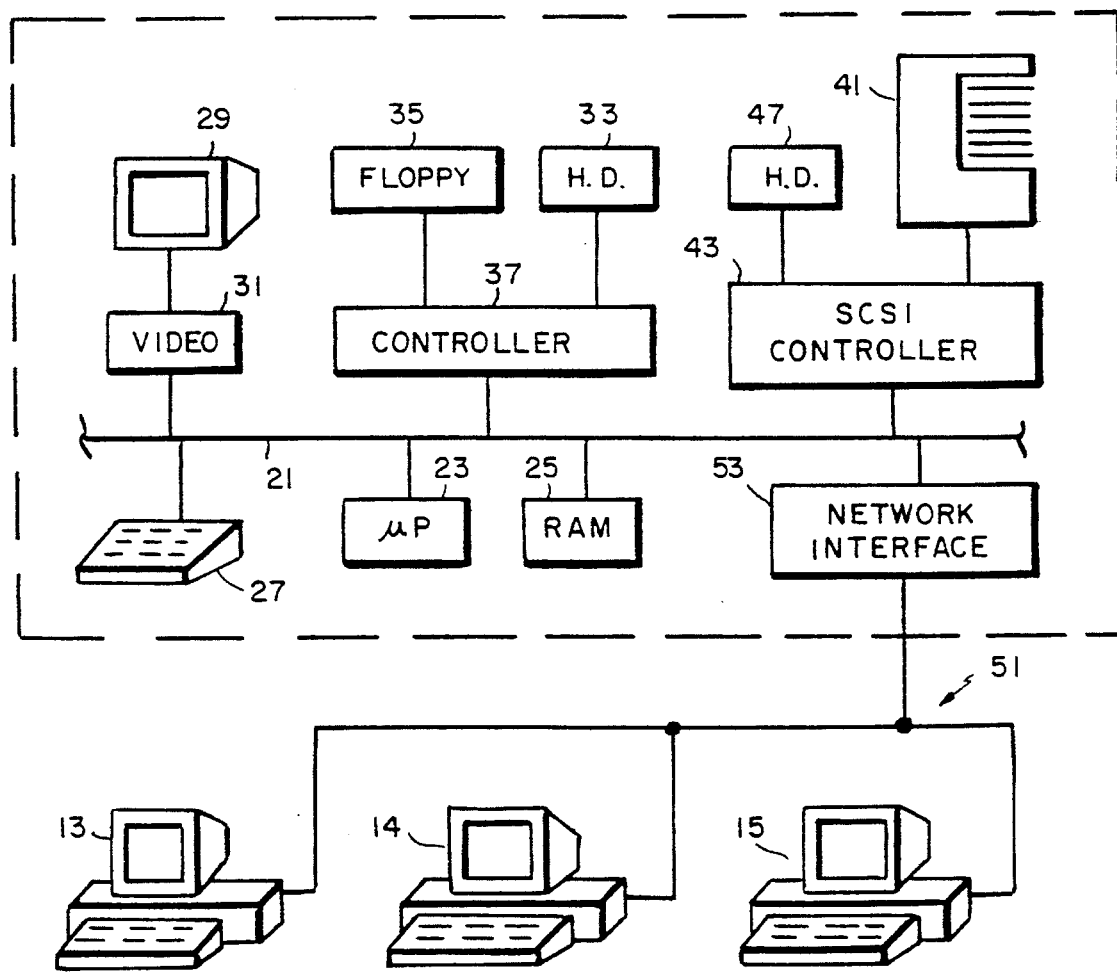
FIG. 1 is a schematic block diagram of a computer system employing a directory system in accordance with the present invention.

Referring now to FIG. 1, the computer system illustrated there involves a file server 11 together with a plurality of work stations 13–15. While the present invention is equally applicable to Unix based systems or networked MacIntosh computers from Apple Corporation, the particular embodiment illustrated employs computers of the type which are generally described IBM PC compatible. Such computers utilize a data bus, e.g., meeting the so-called ISA standard and typically employ the MS-DOS operating system. Such a data bus is designated by reference character 21 in FIG. 1.

Coupled to the bus 21 are a microprocessor 23 e.g., an Intel model 80486, and random access memory (RAM) 25. For user interaction the system also includes a keyboard 27 and a CRT 29 operating through a video controller 31 coupled to the bus 21. As is also typical, the system illustrated includes a system hard disk 33 and a floppy disk drive 35 which are coupled to the bus through a controller 37 which may, for example, be of the IDE type.

A juke box type CD player is designated by reference character 41 and is coupled to the system bus 21 through a SCSI controller 43 which can accommodate a plurality of such CD players or other SCSI type devices in a daisy chain arrangement. Preferably, the controller 43 also provides access to the bus 21 for a separate hard disk 47 which is dedicated to directory and caching operations in support of the CD ROM drive 41.

A local area network 51 is incorporated to provide data communication between the work stations 13–15 and the file server 11, each of these devices are being coupled to the network through a network interface card, e.g., as indicated by reference character 53 in the file server 11.

Figure 2:
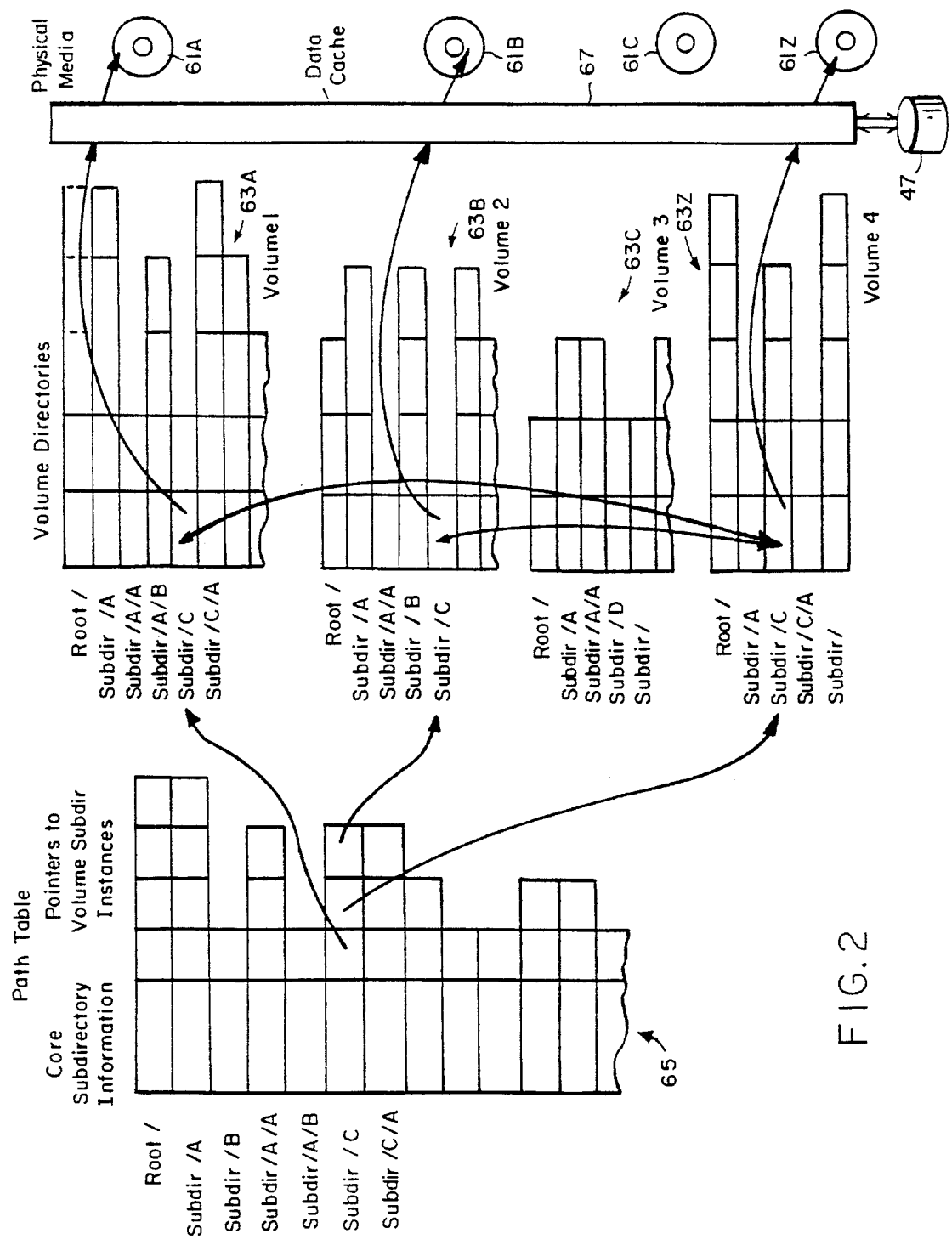
FIG. 2 is a diagram illustrating data structures employed in the directory system of the present invention.

Referring now to FIG. 2, the individual CD ROMs are designated by reference characters by 61A–61Z. In the embodiment illustrated, the CD ROMs are assumed to conform to the standard known as ISO 9660. CD ROMs conforming to this standard include directory information which can be utilized over a wide variety of platforms including IBM PC compatibles, Apple MacIntosh, and Unix systems. In accordance with the practice of the present invention, the directory data on the individual CD ROMs is typically read only when a media volume is first inserted or added to the collection and this information is used to build the augmented directory data structures described hereinafter and these augmented structures are then utilized during the actual running or use of the computer system.

Associated with each CD ROM is a respective volume directory 63A–63Z. As illustrated, each volume directory comprises a horizontal line for each component root directory or sub-directory. Within each directory there may be multiple files indicated simply by blocks to the right of the respective root directory or sub-directory designator. The file information for each file in the volume directory for each file on the respective CD ROM include not only the normal name, attribute, disk location and time-stamp data which is derived from the directory information on the physical CD ROM but also certain pointers as described in greater detail hereinafter. In addition to the volume directories 63A–63Z, the directory system of the present invention also involves a path table 65 which is utilized in accessing the volume directories and, through the volume directories, the files on the CD ROMs themselves.

The file information in each volume directory which corresponds to a given file on the physical media includes data identifying the location on the physical media where the actual file may be found. Accessing of the actual data is preferably through a conventional caching system designated generally be reference character 67. The caching system operates the hold frequently accessed data from the CD ROMs in the hard disk 47 as indicated. The caching system 67 is essentially conventional and is not the directory caching system which is described in greater detail hereinafter.

While not all of the fields are involved in the functioning of the systems of the present invention, the following table provides a representative example of the file information provided for each of the file blocks in the volume directory tables.

| FILE DESCRIPTOR | |
|---|---|
| Field | Description |
| Name | the file name |
| FileType | type identifier, indicating whether the file described by this entry is a regular file or a subdirectory |
| CreateTime | the creation date and time for the file |
| FileLen | the length of the file (ONLY if the FileType field indicates that the file is NOT a sub-directory) |
| PtrDataLocation | pointer to the location of the file data on the source media of the volume (ONLY if the FileType field indicates that the file is NOT a subdirectory) |
| PtrAltLocation | pointer to an alternate location of a copy of the file data on a hard disk (ONLY if the FileType field indicates that the file is NOT a subdirectory) |
| PtrParent | pointer to the path table entry for the parent directory of the file described by this entry |
| PtrOlder | pointer to a file descripter within the directory file for another volume, with values of Name and PtrParent fields identical to, and a value of CreateTime earlier than or the same as, the values of the corresponding fields in this entry |
| PtrNewer | pointer to a file descripter within the directory file for another volume, with values of Name and PtrParent fields identical to, and a value of CreateTime later than, the values of the corresponding fields in this entry |

As will be understood by those skilled in the art, the inclusion of a large number of accessible CD ROMs in the file server system means that there will likely be substantial repetition or duplication of directory and sub-directory designations. Certainly each CD ROM will have a base or root directory. Further, sub-directory designations will also typically be duplicated to some depth. The path table includes a list, a horizontal line as illustrated in FIG. 2, for each unique directory or sub-directory designation which occurs in the collection of CD ROMs. In addition to the directory information itself, the path table includes, for each directory, a block of data which includes a pointer to the volume directory table for any volume (CD ROM) which includes a directory identified by that name or designator. The several occurrences of the same directory designator are frequently referred to herein as "instances". Assuming that the root directory for each of the CD ROMs has the same designation, the first line or root directory of the path table will thus have a sequence of pointers equal in number to the number of physical media volumes. Assuming that directory designators names are arranged in a tree-like structure, as is typically the case, the number of pointers associated with each directory designator will typically decrease as one proceeds further along the branching structure. It should be understood, however, that the path table is not necessarily arranged in order of depth but, rather, its order derives from the order in which the individual physical volumes are added to the system in accordance with the procedure described hereinafter.

By way of example, the data illustrated in FIG. 2 assumes that a sub-directory designated /C occurs in three (3) of the CD ROMs i.e., 61A, 61Z, 61B. Accordingly, the linear path table line corresponding to sub-directory /C comprises three (3) data blocks including pointers (represented by arrows) which point to the same named sub-directories in each of the volume directories 63A, 63B, 63Z. Each of these is considered to be an "instance" of the sub-directory designator.

Also by way of example, the situation illustrated in FIG. 2 assumes that each of the three instances of directory /C includes a file which has the same name as a file in each of the other instances. The files are assumed to differ only in the time of creation or last editing i.e., the file's date stamp. In accordance with one aspect of the present invention, the file information in the volume directories for each file on the respective CD ROM includes not only the information which is in the directory of the CD ROM itself but also a pair of pointer fields. One of the pointer fields identifies, in another volume, a file having the same name but a next earlier time stamp (if extant) and the other identifies in a file in another CD ROM which has a next later time stamp (if extant). These pointer fields thus establish, as will be understood by those skilled in the art, a doubly linked list which spans across the volume directories. In one sense, this linking can be thought of as being orthogonal to the linking which passes from the path table 65, through the volume directory 63, to the physical volumes 61A–61Z. As is explained in greater detail hereinafter, this orthogonal linking allows the directory data structure to be updated in response to the insertion or removal of a given physical volume (CD ROM) without having to re-scan all of the directories on the CD ROMs themselves or otherwise fully rebuild the directory structure.

Figure 3:
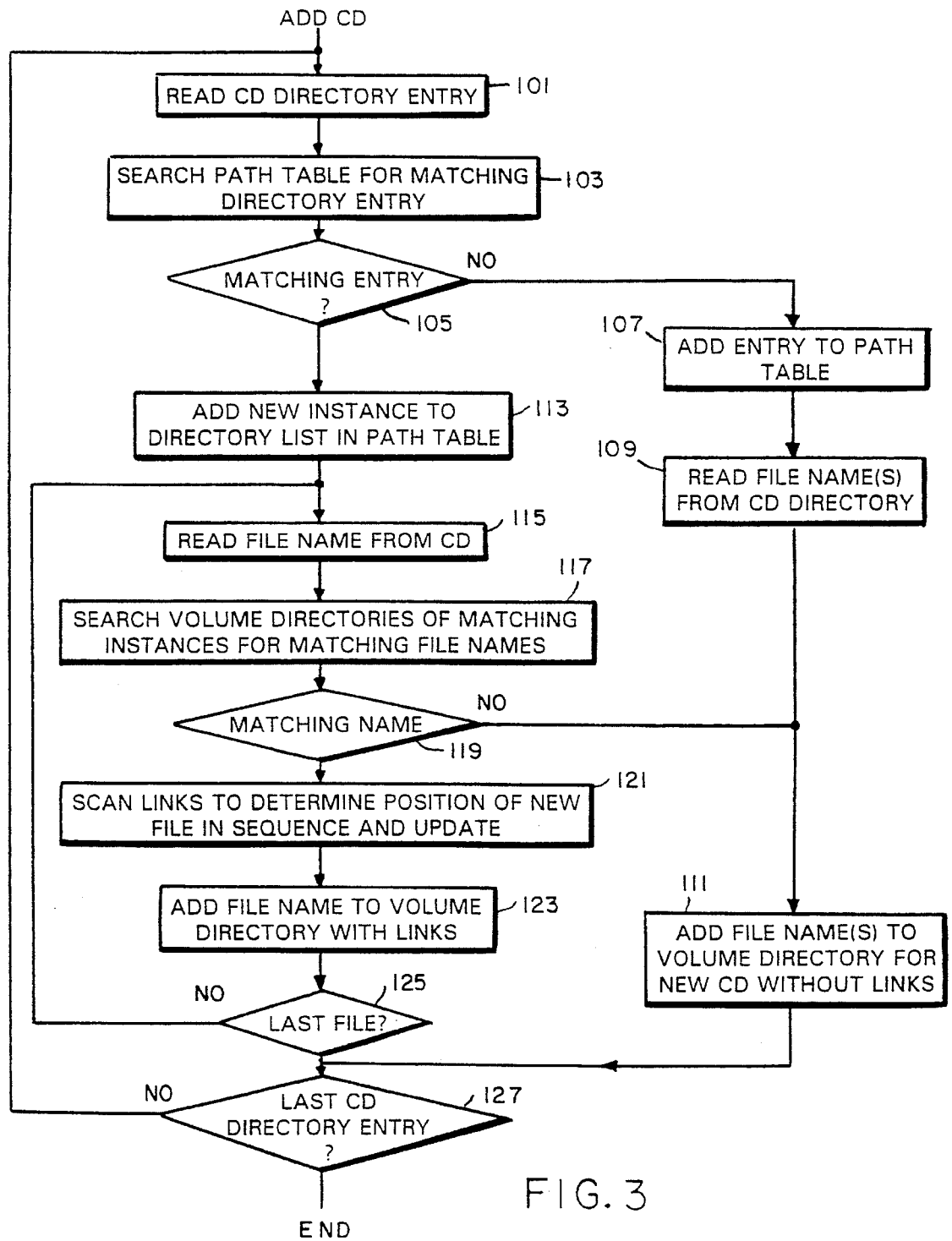
FIG. 3 is a flow chart of a computer implemented method for building up data structures of the type illustrated in FIG. 2 as individual volumes are added to a data storage system.

As indicated previously, the directory system of the present invention allows new volumes to be added to the pre-existing available volumes in an efficient an orderly manner. Essentially the same procedure is used to build up the directory data structure from the start. Referring now to FIG. 3, when a new CD volume is added, the system starts by reading the directory entries from the CDs, starting from the first. This is indicated at block 101. For each directory entry, the system searches the path table 65 for a matching directory entry as represented at block 103. If a matching entry is not found, as tested at block 105, a corresponding new directory entry is added to the path table as indicated at block 107. Also, the names of files within that directory are read from the CD directory itself as indicated at block 109 and are added to a volume directory for the new CD, without the historical links or pointers described previously. This is represented at block 111. On the other hand, if a matching entry is found, a new instance is added to the matching entry in the directory list in the path table 65, as represented at block 113.

As each file name is read from the directory of the new CD volume, as represented at block 115, as search is conducted through the volume directories 63 of matching instances i.e., matching directory designators, for matching file names, as indicated at block 117. If no matching file name is found in a given instance, as tested at block 119, the file name is added to the volume directory 63 for the new CD without links, again as indicated at block 111.

If however, a matching name is found in one of the pre-existing instances of the directory designator, the pointers or links which extend from that file info block are scanned to determine the historical relationship of the new occurrence of the file to any that exist previously and the links and the pointers associated with the next preceding and next succeeding entries (if extant) are updated as indicated at block 121. Also, the file name is added to the volume directory for the current volume with appropriate pointers pointing to the next preceding and next succeeding files in the historical sequence as indicated at block 123.

If the file is not the last file in that directory, as tested at block 125, the procedure loops back to block 115. After reaching the last file in the current sub-directory, the procedure tests to see if the last directory entry has been reached, as indicated at block 127, and, if not, loops back to block 101 as illustrated. Once all of the files in all of the directory entries in the new CD have been accommodated, the procedure is complete. As will be understood, a complete directory encompassing a large number of CD volumes can be progressively built up in this manner and, as each new CD volume is added, it is not necessary to fully scan all of the directories of all of the volumes but, rather, only those pre-existing entries which match entries in the new CD volume need to be adjusted or updated. As will be understood, removing a volume is accomplished by performing an essentially complimentary procedure which adjusts the historical pointers of time adjacent file entries before removing the instance corresponding to the volume being deleted from the path table.

The entire set of directory data structures described with reference to FIGS. 2 and 3 are stored on the hard disk 47. Selected blocks of the data are transferred to and kept in cache storage locations in the computers random access memory 25 in a manner described in greater detail hereinafter. The object of the caching system is to keep, in the cache locations, that data which is most likely to be used or is most frequently used. The caching scheme of the present invention employs a combination of aging and random selection techniques to achieve a mode of operation which is particularly well suited to the directory data utilization of the present invention but is also well suited for other purposes.

Figure 4:
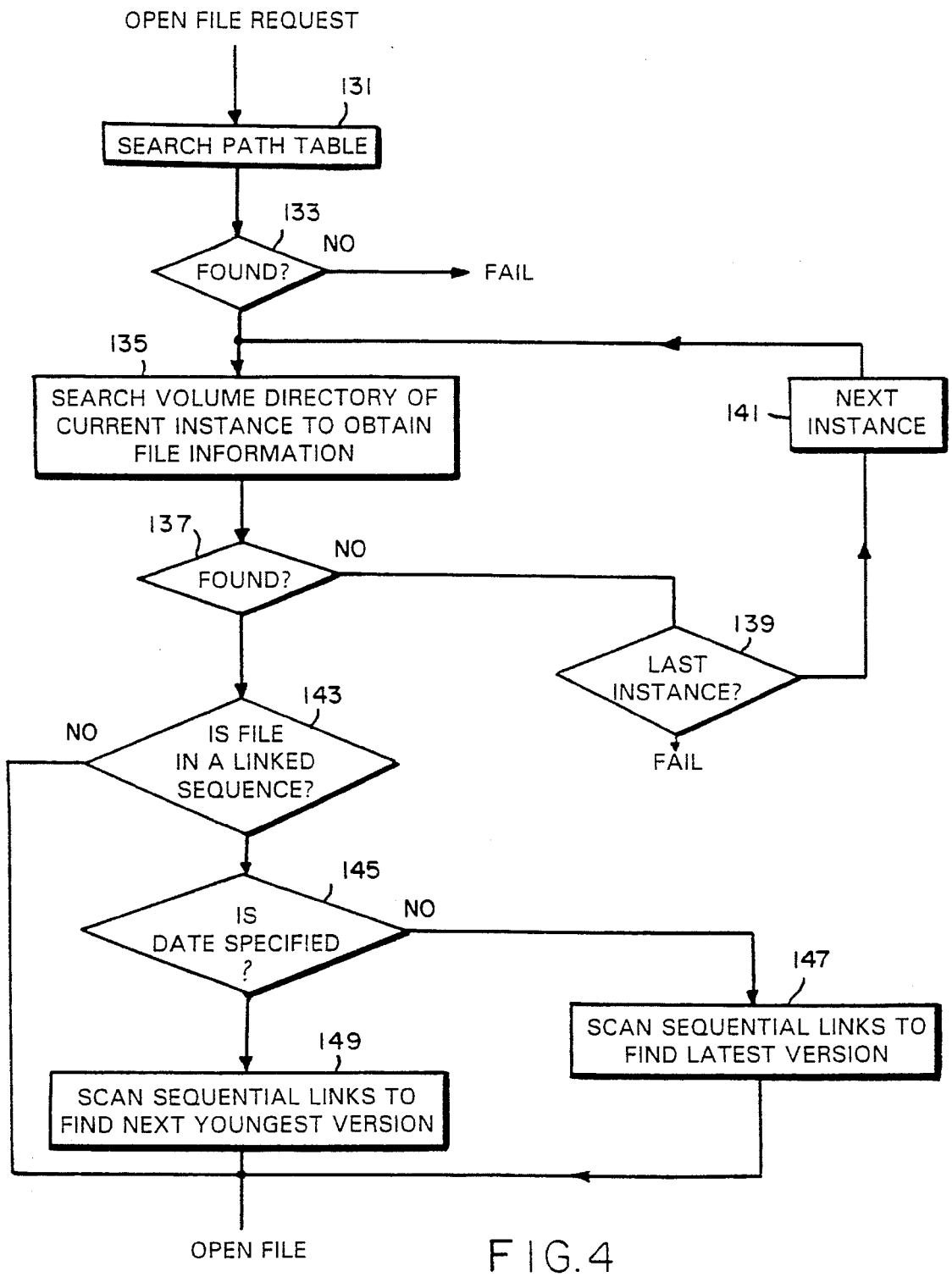
FIG. 4 is a flow chart illustrating a procedure for opening a file utilizing the directory system of the present invention.

With a directory data structure built up as described with reference FIG. 3, the procedure provided for opening a file is illustrated in FIG. 4. As will be understood, the user, in most basic operating systems, can either find the file by including the directory path to reach it or, if a sub-directory is already active, he may merely specify the file name and the path will be effectively added automatically. In most instances, the user will be looking for the latest version of the file and the procedure illustrated in FIG. 4 assumes that is the case unless a date is specified.

Initially, the path table 65 is searched as indicated at block 131 to find the needed directory path. If it is not found, as tested at block 133, a FAIL is reported to the user. If the path is found, the volume directory of the current instance is searched, as indicated at block 135, to obtain the file information. If the file information is not found in the current instance of the directory designation, as tested at block 137, it is then determined, at block 139, if this is the last instance. If it is and no match has been found, a FAIL situation is reported to the user. Otherwise, the procedure then advances to the next instance of the of the path designation, as indicated at block 141, and returns to the search represented at block 135.

Once a matching file is found, as tested at block 137, the file information is then tested, as indicated at block 143, to determine if the file is in a linked sequence. If the file is not in a linked sequence, it is the file that is opened. If the file is in a linked sequence, the system then determines if the user has specified a date, as tested at block 145. If not, the sequential links are scanned, as indicated at block 147, to find the latest version and that is the file that is opened.

If a date has been specified by the user, the sequential links are scanned, as indicated at block 145, to find the next youngest version as determined by the date stamp. Since this is the version which would have been in effect at the date specified by the user, this file is then the one which is opened.

The directory system of the present invention also enables the generation of a directory listing without repeating files of having the same path and name, since such could produce a truly immense listing. Typically, the user will also want to introduce filters, e.g., partial spelling of file names or limitations on extensions, so as to also reduce the size of the listing. Facilities for implementing such filters are conventional and are normally provided in basic operating systems.

Figure 5:
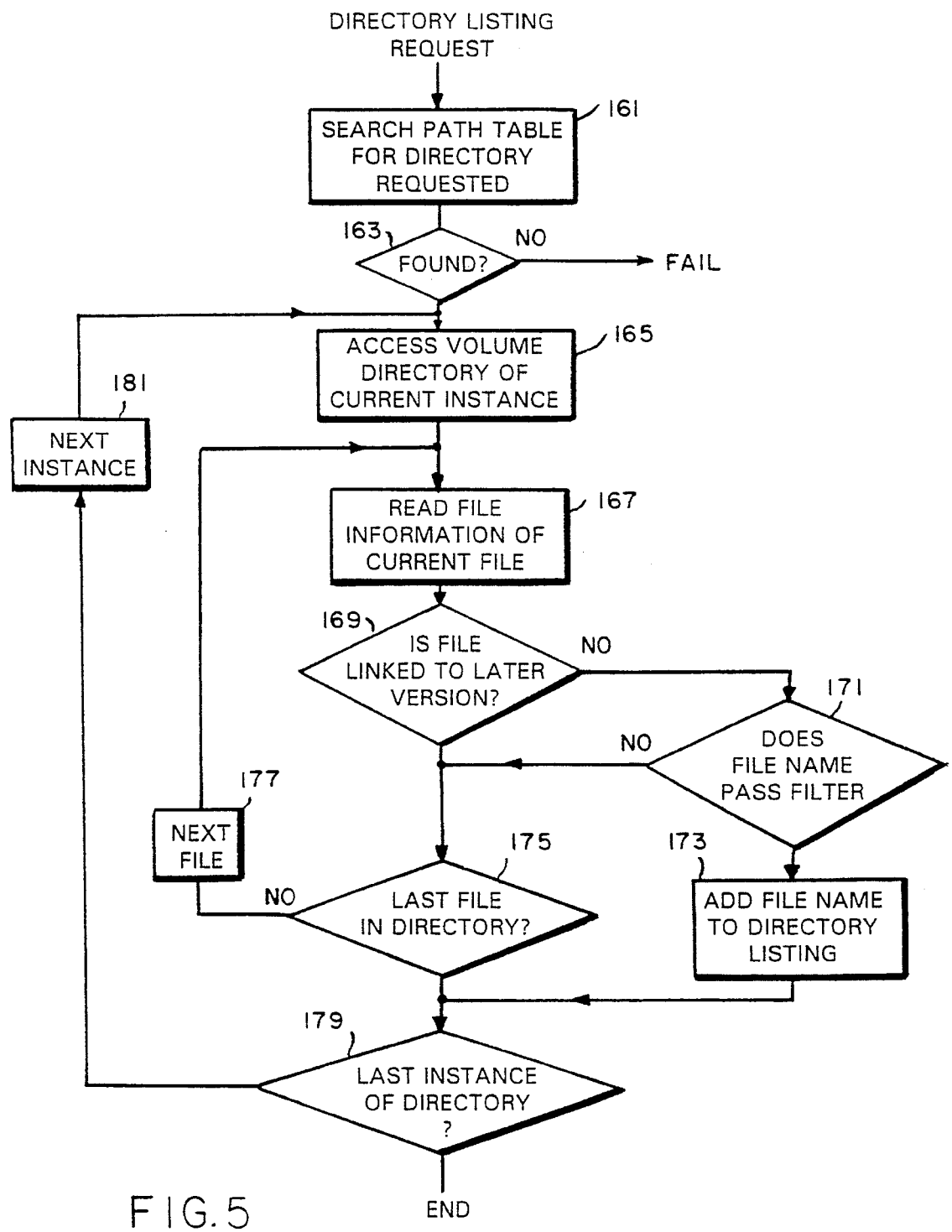
FIG. 5 is a flow chart of a method of a obtaining a file listing using a directory system of the present invention.

Referring now to FIG. 5, a directory listing request first initiates, as indicated at block 161, a search of the path table 65 to determine whether the directory specified exists in the path table. If a directory specified not found, a FAIL situation is reported to the user. If the path is found, the volume directory of the current instance is accessed, as indicated at block 165, and the file information for the current file is read as indicated at block 167. If the file is not linked to a later version, as tested at block 169, and its name passes any filter established by the user as tested at block 171, the file name is added to the directory listing as indicated at block 173.

If the procedure has not reached the last file in the directory in the current directory path, as tested at block 175, the system advances to the next file, as indicated at block 177, and loops back to block 167.

In order to provide a complete directory and not just a directory of the first instance of a path designation which meets the request, the system tests for the last instance of the designated directory as indicated at block 179 and, if it is not the last instance, the next instance is obtained as indicated at block 181 and the procedure returns to block 165. As will be understood, this procedure produces a listing which includes only the latest version of each file name and path which meet the criteria established by the user.

It should be understood that the procedures of the present invention may also be employed to provide multiple aggregated directory structures from the same set of data volumes. This may be useful to accommodate different basic operating systems or different naming conventions, e.g. systems which accommodate long names rather than merely the short names typically utilized by basic operating systems.

Notwithstanding the efficient procedures and data structures employed, it will be understood that the aggregated directory formed by the present invention itself comprises a very large amount of data when a large number of CD volumes are involved. In such cases, it is undesirable to keep the entire aggregated directory data structure in random access memory. On the other hand, some parts of the directory structure e.g., those associated with the root directory are used frequently and should advantageously be available without requiring even a hard disk access. In accordance with another aspect of the present invention, the directory system of the present invention employs a novel caching system which significantly improves typical response time. In some ways, the caching scheme employed provides the best features of a "least frequently used" type caching scheme with the best features of a hashed caching scheme.

Figure 6:
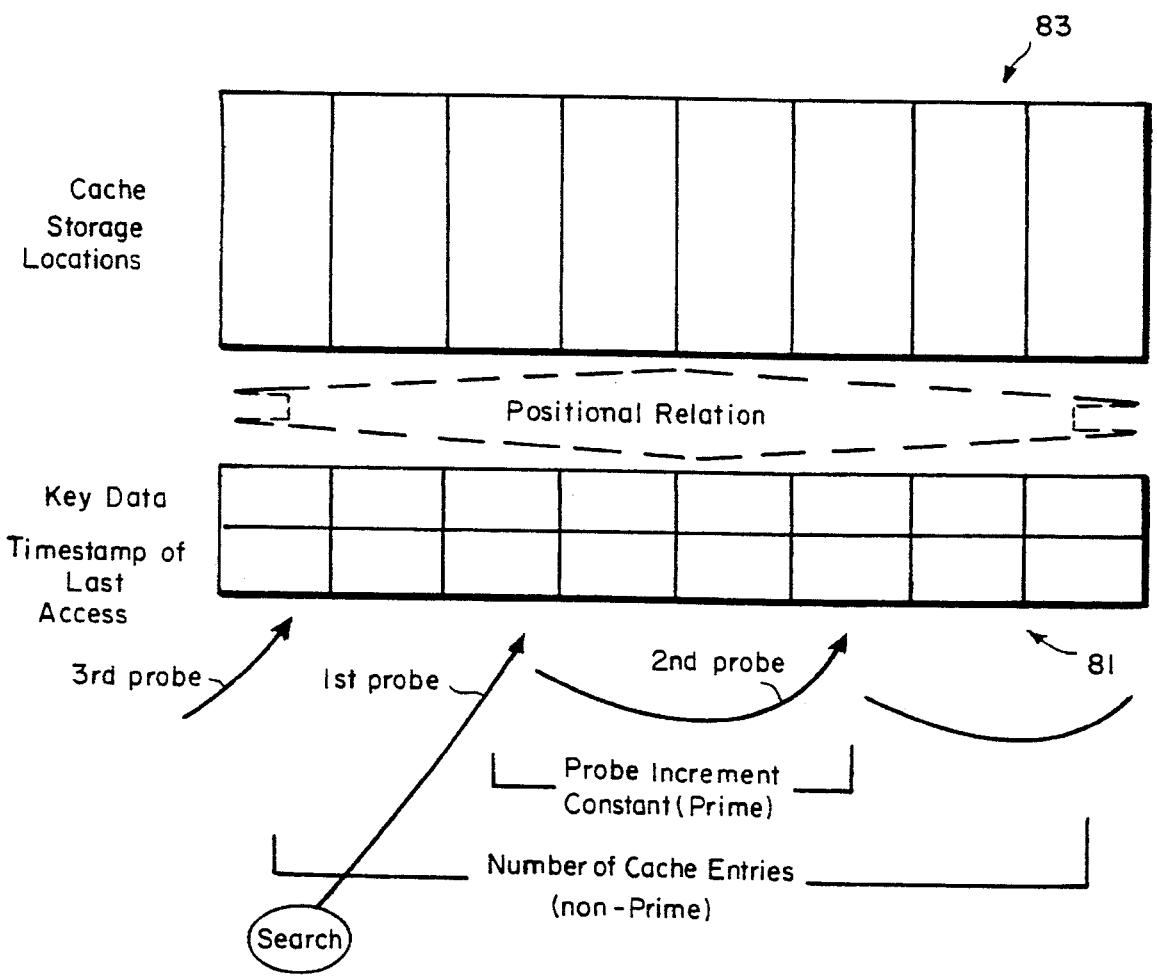
FIG. 6 is a diagram illustrating data structures used in a caching scheme employed in the directory system of the present invention.

Referring now to FIG. 6, the caching scheme of the present invention employs a cache table or list 81 having a number of entries which correspond one for one with a series of cache storage locations 83 in random access memory. Each of the cache storage locations is sized to accept a substantial block of data from the directory data structure of FIG. 2.

The hash table may, for example, comprise 16384 entries (?). An initial entry position into the hash table, e.g., an offset from its start, is obtained by hashing the data defining the disk location where the data sought is located on the hard disk 47. As is understood, the process of hashing involves manipulating and combining sections of the input or location data to derive a hash value which comprises fewer significant elements. As is also understood, different input values i.e., disk locations in this particular situation, may hash to the same hash code. Accordingly, provision must be made for entering at alternate locations in the table as well. It should be understood that disk location can be specified in various ways, both direct and indirect, e.g. as through the use of names.

The hash table 81 employed in the present invention includes two (2) data elements in each location. Firstly, there is a time stamp which identifies the time of last access for the information stored in the corresponding location in the cache storage 83. It is the time stamp data which is used for aging the contents of each cache location and this time stamp data is also referred to herein as aging data. In addition, each location in the hash table 81 includes key data which uniquely identifies the disk location on the hard disk 47 from which the data now stored in the corresponding cache location was obtained. This key data is used to determine or confirm that the cache data corresponding to a given list entry is, in fact, the data being sought by the current access. Basically, the caching scheme of the present invention makes a predetermined number of tries to find the needed directory data and, while it does so, it keeps track of the oldest data encountered during the trying procedure. If the desired data is not found within the predetermined number of times, it is read from the hard disk 47. In addition to being provided to the requestor, this data read from the hard disk is stored or entered into that cache storage location which corresponds to the oldest data encountered during the successive tries.

Figure 7:
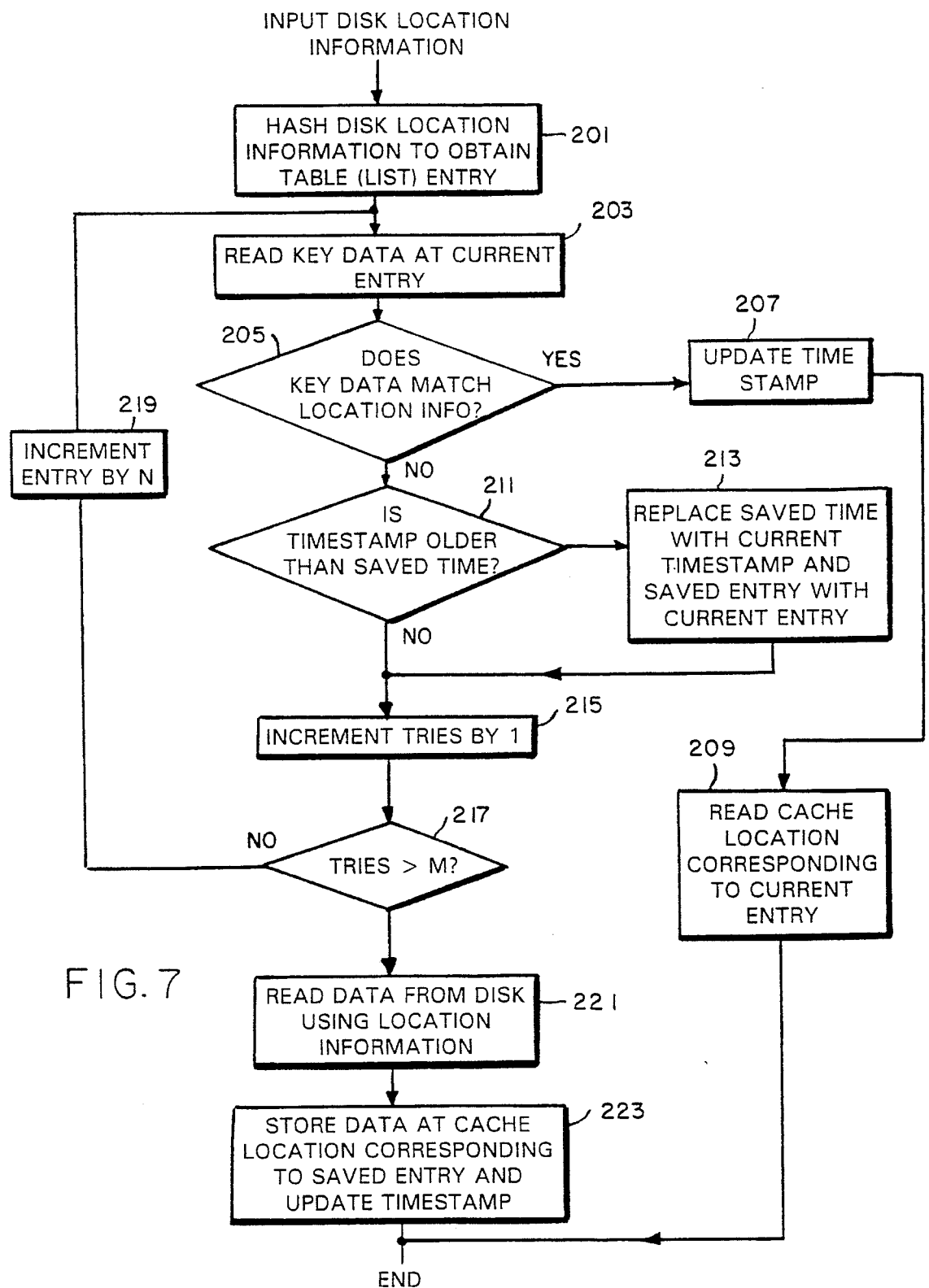
FIG. 7 is a flow chart illustrating a computer implemented method for performing the caching operations.

As indicated earlier, the initial entry into the hash table is obtained by hashing the hard disk location information. Successive entries or tries are offset from the preceding try by a fixed increment, preferably a prime integer such as 1223. After a predetermined number of such tries e.g., five, the data is read from the hard disk 47 as indicated and put into a cache storage location in substitution for the oldest data encountered during the sequence of tries. This procedure is illustrated in FIG. 7.

As indicated at block 201, an initial table or list entry is obtained by hashing the disk location information. The key data is then read at the current entry, as indicated at block 203, and is compared with the location information, as tested at block 205, to determine if the corresponding cache storage location actually holds the directory data desired i.e., the directory data which is stored at the disk location specified by the inquiry or requestor. If there is a match, the time stamp for that cache table location is updated, as indicated at block 207, and the cache location itself is read out to provide the requested data, as indicated at block 209.

As indicated earlier, the procedure saves a value corresponding to the oldest time stamp value encountered during a succession of tries. This value is referred to as "SAVED TIME". In addition the procedure saves the entry position corresponding to the SAVED TIME, this entry being identified as "SAVED ENTRY". If the key data does not match the location information, the procedure then tests, at block 211, whether the current time stamp is older than SAVED TIME. If it is, the SAVED TIME value is replaced with the current time stamp value the SAVED ENTRY position is replaced with the current entry.

For each attempt to match up the location information with the key data, the procedure increments a count, designated TRIES, by one, as indicated at block 215. As described previously, the procedure makes a predetermined number of attempts, this number being designated as M. If the number of TRIES does not exceed M, as tested at block 217, the entry value is incremented by N as indicated at block 219 and the procedure loops back to block 203.

Once the number of tries exceeds M, the procedure reads the requested data from the hard disk 47 using the input location information directly. In addition to providing this data to the requestor, the data is stored at the cache location corresponding to SAVED ENTRY. As described previously, this is the cache position holding the oldest data encountered during the successive tries attempted in response to the current inquiry. The time stamp is correspondingly updated as indicated at block 223.

As is understood, the hashing access system implemented by this scheme provides for very fast response. However, as is understood, conventional hashing schemes are basically randomizing procedures and this randomizing carried over into the purging of data in the cache locations. A significant advantage of the present method is that the purging of data is based in substantial part on age and not just on the hashing algorithm. This is particularly significant in the aggregating directory system of the present invention since it protects frequently used data and, in particular, protects and keeps accessible the data associated with the root directory.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a computer system providing data access to a plurality of individually replaceable physical data volumes each of which contains at least one directory identifying named and timed data files which are contained in the respective volume with the possibility existing that files with the same name may exist on different ones of said volumes with different time indicia; a method of providing, to a user, an aggregated file listing, said method comprising:

generating from said directories respective volume directory tables containing file names and respective media locations where respective file data may be read, said volume directory tables including also a pointer identifying any next predecessor in time file with the same name if extant in the plurality of physical data volumes, and a pointer identifying any next superseding in time file with the same name if extant in the plurality of physical data volumes generating from said directories a path table which provides, for each directory, a logical access path together with a pointer location containing a pointer identifying at least one volume directory table corresponding to a physical volume where the file data may be read, whereby said listing may be updated when an available volume is changed by updating the respective volume directory table and the related pointers in other volume directory tables without accessing all directories.

2. A computer implemented method of aggregating directory listings from a succession of individually replaceable data volumes having respective designations, said method comprising:

providing a path table data structure for holding entries for respective volume designations;

for each new data volume, generating a volume directory table;

for each directory in each new volume in succession, performing the steps of:

searching the path table for an existing entry matching the designation of the current volume directory if no match is found, making a new entry in the path table corresponding to the current volume directory if a match is found, adding to the matching existing entry a pointer to the corresponding volume directory table for each file in the current data volume directory, searching the volume directory tables of matching directory designators for matching file names and, if matching file names are found, linking the matching file names with pointers identifying a sequence of the files.

3. A computer implemented method for providing access to an aggregated directory listing assembled from a succession of data volumes, said method comprising:

providing a path table data structure for holding entries for respective volume designations;

for each new data volume, generating a volume directory table;

for each directory in each new volume in succession, performing the steps of:

searching the path table for an existing entry matching the designation of the current volume directory if no match is found, making a new entry in the path table corresponding to the current volume directory if a match is found, adding to the matching existing entry a pointer to the corresponding volume directory table for each file in the current data volume directory, searching the volume directory tables of matching directory designators for matching file names and, if matching file names are found, linking the matching file names with pointers identifying a sequence of the files;

storing said path table data structure and said volume directory tables in a rotating disk memory and having in response to a request for directory data identified by disk location information, hashing that information to obtain an entry location into a list having elements corresponding to cache locations in random access memory, said table including, for each entry location, key data which can be matched to disk location information and age data identifying how recently the corresponding cache location has accessed data in response to a request;

if the key data matches the request, providing the requested data from the corresponding cache location;

if the key data does not match the request, initiating successive entries into said list at successive locations, each of which is separated from the previous location by a predetermined number of locations, and comparing the key data with the request for each entry;

during the succession of entries, storing the identity and age data of the least recently accessed entry position encountered during the succession of entries;

if no match is found within a predetermined succession of said entries, reading the requested data from disk and storing it at the corresponding least recently accessed cache location encountered during the succession of tries.

4. In a computer file system in which file directories are stored in rotating disk memory having relatively long latency, a system for caching portions of said directories in random access memory having relatively short latency, said system comprising:

a cache address list providing a plurality of entry positions corresponding to cache memory locations and, with each position, an age data field representing how recently that position provided cached directory data;

means for hashing disk location data to obtain a corresponding entry position in said list;

means for determining if an entry read from said list corresponds to a given file name;

means for reading, from said list, an entry based on given disk location data and submitting the entry read to said determining means;

means operative, if an entry read corresponds to the given disk location data, for accessing directory data from the corresponding random access memory cache location, and for updating said age data field, iterative means operative, if an entry read does not correspond to the given file name, for successively reading from said list at positions each of which is spaced from the last read entry position by a predeterminable number of entry positions along said list, said iterative means being operative to maintain a record identifying which of the successive positions read in response to a given file name held the least recently accessed directory data, together with corresponding age data, said iterative means being operative also, after a predeterminable number of reads from said list, to initiate a read of the requested directory data from rotating memory, to store a corresponding block of said directory information in the random access cache memory location identified by said least recently accessed list position, and to update the corresponding age record.

5. In a computer system having rotating disk memory having relatively long latency and random access memory having relatively short latency, a method of caching selected data from said disk memory into random access memory, said method comprising:

in response to a request for data identified by disk location information, hashing that information to obtain an entry position into a list having elements corresponding to cache locations, said table including, for each entry position, key data which can be matched to disk location information and age data identifying how recently the corresponding cache location has provided data in response to a request;

if the key data matches the request, accessing the requested data from the corresponding cache location;

if the key data does not match the request, initiating successive entries into said list at positions, each of which is separated from the previous position by a predetermined number of positions, and comparing the key data with the request for each entry;

during the succession of entries, storing the identity and age data of the least recently accessed cache location corresponding to the list positions encountered during the succession of entries;

if no match is found within a predetermined succession of said entries, reading the requested data from disk and storing it at the corresponding least recently accessed cache location encountered during the succession of tries.

* * * * *